(12) United States Patent
Nikolaus et al.

(10) Patent No.: US 8,393,761 B2
(45) Date of Patent: Mar. 12, 2013

(54) LIGHTING DEVICE

(75) Inventors: Ines Nikolaus, Hörlkofen (DE);
Andreas Timinger, Munich (DE)

(73) Assignee: OEC AG, Munich (DE)

( * ) Notice: Subject to any disclaimer, the term of this patent is extended or adjusted under 35 U.S.C. 154(b) by 245 days.

(21) Appl. No.: 12/731,575

(22) Filed: Mar. 25, 2010

(65) Prior Publication Data
US 2010/0246175 A1   Sep. 30, 2010

(30) Foreign Application Priority Data

Mar. 27, 2009 (DE) .......................... 10 2009 015 424

(51) Int. Cl.
*F21V 17/02* (2006.01)
(52) U.S. Cl. .... 362/319; 362/241; 362/280; 362/296.05
(58) Field of Classification Search .................. 362/277, 362/241, 247, 280, 284, 311.02, 311.06, 362/311.1, 311.14, 319, 322, 324, 512, 311.01, 362/296.01, 296.05
See application file for complete search history.

(56) References Cited

U.S. PATENT DOCUMENTS

| | | | |
|---|---|---|---|
| 2,282,167 A | 5/1942 | Cullman | |
| 4,141,059 A * | 2/1979 | Shiojiri | 362/280 |
| 6,367,950 B1 * | 4/2002 | Yamada et al. | 362/241 |
| 6,499,862 B1 | 12/2002 | Weigert et al. | |
| 2004/0201987 A1* | 10/2004 | Omata | 362/311.02 |
| 2010/0046220 A1* | 2/2010 | Fukasawa et al. | 362/311.02 |
| 2011/0170289 A1* | 7/2011 | Allen et al. | 362/235 |

FOREIGN PATENT DOCUMENTS

| | | |
|---|---|---|
| DE | 86 22 788.2 U1 | 11/1988 |
| DE | 298 04 248 U1 | 5/1998 |
| DE | 199 01 391 A1 | 9/2000 |

OTHER PUBLICATIONS

Seoul Semiconductor, lighting device under the trade name W724CO, Technical Data Sheet, Document No. SSC-QP-7-07-24, 15 pages, Rev. May 3, 2008.

* cited by examiner

*Primary Examiner* — Y My Quach Lee
(74) *Attorney, Agent, or Firm* — Houston & Associates, LLP

(57) ABSTRACT

A lighting device with an extended, non-punctiform light source, a reflector which conically surrounds the light source, and a lens for concentrating the emitted light is characterized by the fact that the lens is mounted so as to be capable of moving along an optical axis of the lighting device within a predetermined range of movement in such a way that the focal point of the lens in the direction of emission can be shifted at least into an area behind the notional apex of the reflector.

26 Claims, 3 Drawing Sheets

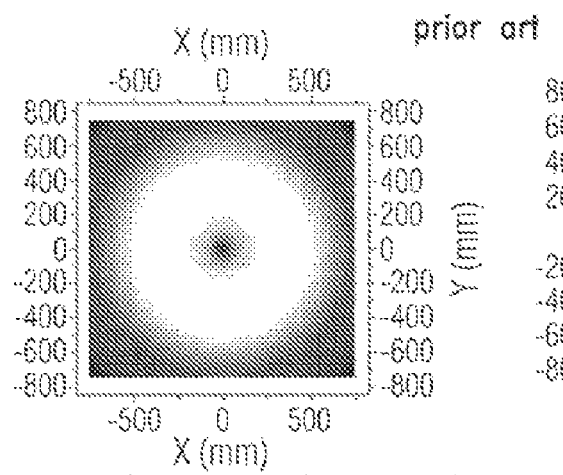
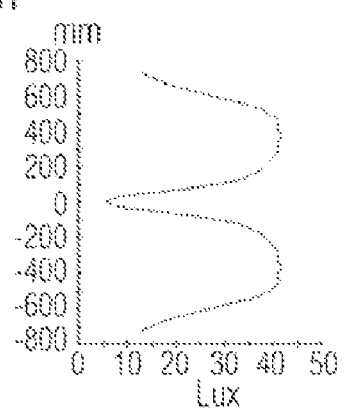
FIG. 4a  FIG. 4b
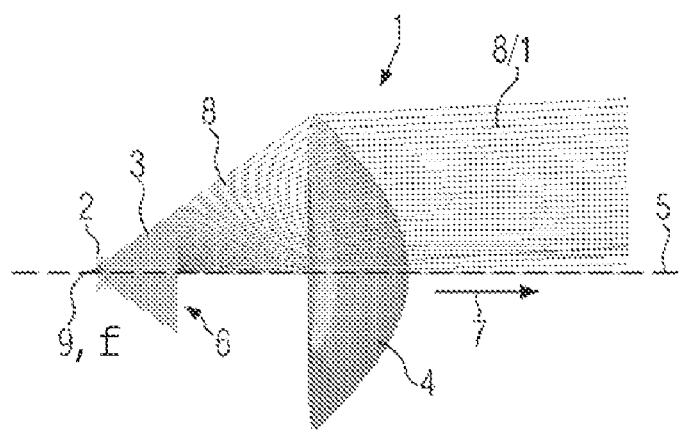
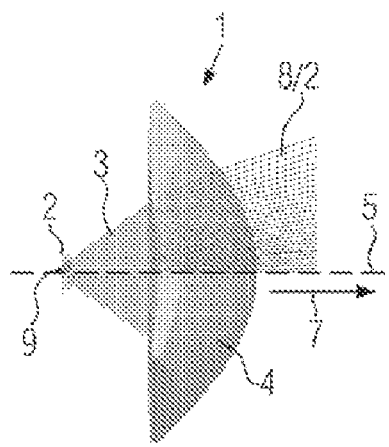
FIG. 5  FIG. 6
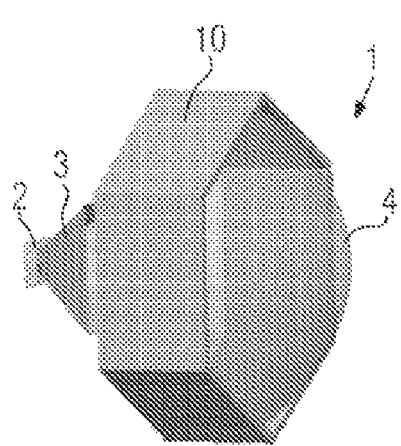
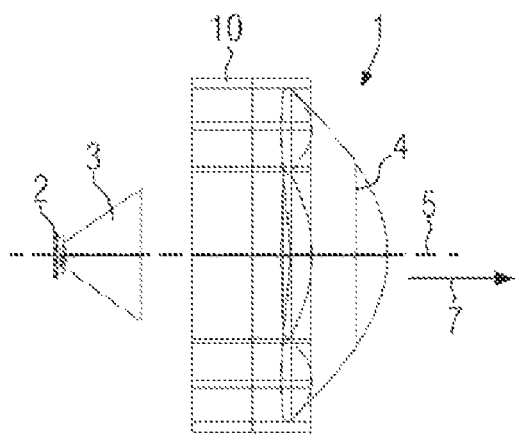
FIG. 7  FIG. 8

LIGHTING DEVICE

RELATED APPLICATIONS

This application claims priority to German Patent Application No DE 10 2009 015 424.8, filed on Mar. 27, 2009 which is incorporated herein by reference in its entirety.

BACKGROUND OF THE INVENTION

Lighting devices with a light source, a reflector encompassing the light source, and a lens mounted in front of the reflector, are known. Such lighting devices generally have a light source such as a filament lamp, a halogen lamp or the like, and are so dimensioned that the light source represents approximately a point light source in relation to the reflector and the lens.

Known from each of DE 298 04 248 U1, DE 199 01 391 A1, DE 86 22 788 U1 and U.S. Pat. No. 2,282,167 are lighting devices, in particular headlights, in which the aperture angle of the light ray bundle may be adjusted by shifting the optical elements (lenses).

SUMMARY OF THE INVENTION

If an extended light source is provided in the reflector, then there is the problem that the structure of the extended light source may be imaged optically by the lens, leading to a cone of light rays of uneven intensity. If the light source is for example a light-emitting diode array with for example four light-emitting diodes, each with a square emitting surface and arranged in a square, then dark stripes will occur between the individual emitting surfaces (FIG. 3). With conventional lenses and reflectors, this structure of the light source is imaged in such a way as to produce a far field, with a small light intensity distribution in the centre. From the centre towards the outside, the light intensity distribution increases, then falls again on reaching an edge area (FIGS. 4a, 4b).

The inventors of the present invention have recognised this problem and wished to eliminate this structure. For this purpose they provided a conical reflector with a narrow and a wide aperture. A light source was provided in the area of the narrow aperture. A lens was provided with the focal point in the area of the wide aperture of the conical reflector. In the area of the wide aperture, the light of the several light-emitting diodes is well mixed in the position-space. If this well-mixed light is imaged by the lens into infinity, then a cone of light with uniform light intensity is obtained. This eliminates the problem of imaging of the structure of an extended, non-punctiform light source. This version of a lighting device, not published by the inventors, does indeed produce a cone of light rays with uniform light intensity. However, if it is desired that the aperture width of the cone of light rays should be adjustable, by making the lens movable relative to the reflector, then the problem again arises that the focal point is too close to the light source, so that the structure of the light source is either discernible in the cone of light rays or, with the lens at greater distance from the reflector, the light intensity of the cone of light rays reduces considerably.

The invention is based on the problem of creating a lighting device with an extended light source, in which the widening of the cone of light is adjustable, the cone of light has a uniform light intensity distribution, in particular with no reduction of the light intensity distribution in the centre of the cone of light rays, and the light emitted by the light source is very efficiently bundled to form the cone of light.

The present invention relates to a lighting device with a light source, a reflector and one or more lenses.

The lighting device according to the invention comprises an extended light source, a reflector which encompasses the light source and is in the form of a conical frustum with an aperture at the widened end of the reflector and a tapered end at which the light source is arranged in such a way that the light is radiated towards the aperture of the reflector, and a lens for concentrating the emitted light, wherein the lens is mounted so as to be capable of moving along an optical axis of the lighting device within a predetermined range of movement in such a way that the focal point of the lens in the direction of emission can be shifted at least into an area behind the notional apex of the reflector.

An extended light source is a non-punctiform light source which has structures. Such an extended light source may comprise several individual light sources or also a single non-punctiform emitting surface. The structures of the extended light source produce a cone of light rays in which the structures of the light source are discernible. Areas of the extended light source from which light is emitted are subsequently described as structured areas.

The inventors of the present invention have recognised that the light source of a conical reflector is reflected in such a way that, to an observer, the reflections of the light source seem to be arranged on a section of a sphere. This sphere is concentric to the notional apex of the conical reflector. Within the angle of emission of the reflector, the reflected light sources and the original light source appear arranged on this spherical shell irrespective of the direction from which one looks into the reflector.

These light sources arranged on a section of a sphere each emit separate cones of light rays. Each of these cones of light rays has centrally arranged centroids which are so aligned that they appear to originate from the notional apex of the reflector, forming a spherical wave relative to the notional apex of the reflector.

If the lens is arranged with its focal point at the notional apex of the conical reflector, this produces the two following effects:

1. Optimal concentration of the light close to the physical limit is obtained.

2. A good mixing of the light rays of the different structured areas is obtained.

Since the centroids of all reflected and non-reflected light sources and/or structured areas of the extended light source appear to have their origin at the notional apex of the conical reflector, these centroids form a spherical wave which is optimally concentrated when the lens is mounted with its focal point on the notional apex. The other light rays which are not centroids are of course not so optimally concentrated as the centroids. Nevertheless, the concentration of the other light rays is still very good since the direction of a majority of these other rays diverges only slightly from the direction of the centroids, and these other rays are concentrated only slightly less efficiently than the centroids.

If the focal point of the lens is at a distance from the extended light source or from its reflections, then optical imaging of the extended light source is reliably avoided, and by this means good mixing of the light rays of the different structured areas is obtained. In the range of movement in the direction of emission behind the notional apex, very good mixing of the light rays of the different structured areas is therefore obtained. This distance between the focal point of the lens and the extended light source is preferably at least the distance between the notional apex and the extended light source.

If, from the position in which the focal point of the lens is located on the notional apex of the conical reflector, the lens is moved backwards relative to the direction of emission, i.e. the lens is moved towards the light source or towards the reflector, then the cone of light rays is widened by this action. The luminous flux contained in the cone of light rays is substantially unchanged. In the course of this action, the focal point of the lens is moved away from the spherical section on which the reflected light sources or structures of the extended light source are to be found, so that on account of the great distance between the focal point and the (reflected) light source structures, good mixing of the light emanating from the individual light source structures is obtained.

Consequently, by arranging the focal point of the lens in the direction of emission behind or at the notional apex of the reflector, a cone of light rays with an even light intensity distribution and high luminous flux is produced. By shifting the lens relative to the reflector and the light source respectively, the aperture angle of the cone of light rays emitted by the lighting device may be altered.

Preferably the lighting device is so designed that the range of movement of the lens in the direction of emission extends so far forwards that the focal point of the lens may be brought into congruence with the notional apex of the reflector or at least with the vicinity of the notional apex. In this way, almost optimal concentration of the light emitted by the extended light source is obtained.

In principle it is also possible for the focal point of the lens to be moved from the notional apex to the extended light source, but in this case mixing will deteriorate with increasing proximity to the light source. It is important for the present invention that the range of movement covers at least an area in which the focal point of the lens is behind the notional apex in the direction of emission.

A preferred embodiment of the lighting device has as light source a light-emitting diode array, and the reflector has in cross-section a regular polygonal form, in particular the form of a square.

In a preferred embodiment the size of the lens is such that, at the maximum distance of the lens from the reflector, it completely covers the cone of light rays emitted by the reflector.

The lens may preferably be multifocal, in particular bifocal, while the focal point is preferably smaller in the central area of the reflector than outside this central area of the lens. By this means light rays which pass through the central area of the lens are more strongly deflected than light rays passing through the lens outside this central area. This leads to a further mixing of the light of different structured areas of the extended light source, by which means the structure of the extended light source is even more strongly blurred. The focal length in the central area of the lens may also be greater than outside this central area. This also intensifies the mixing, but the central rays intersect at the focal point in some positions of the lens.

The perimeter of the lens preferably has the shape of a regular hexagon. This makes it possible to arrange several of these lighting devices next to one another. These several lighting devices form an array of lighting devices. In this array, the optical axes of the individual lighting devices are preferably parallel to one another. Diaphragms are preferably also provided, each encompassing a lens and in the form of a tubular section.

The lenses of such an array of lighting devices may be connected physically to one another in such a way that they are movable only together along the respective optical axes. In this way a headlight with a cone of light with a variable aperture angle and high luminous flux is created.

The light sources of the array of lighting devices are preferably rotated a short distance apart from one another when viewed from above. By this means, the structures of the individual light sources still remaining in the cone of light rays are mixed once more, so as to homogenise the overall cone of light rays produced from the cones of light rays of the individual lighting devices.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings:

FIG. 4a is a two-dimensional diagram of the level of illumination of a cone of light rays produced by an array of conventional lighting devices;

FIG. 4b shows the level of illumination of the cone of light rays of FIG. 3 along a section in a coordinate system;

FIG. 5 shows a section through a schematically depicted lighting device according to the invention, in a first position of the lens;

FIG. 6 shows a section through a schematically depicted lighting device according to the invention, in a second position;

FIG. 7 shows a lighting device with diaphragm in a perspective view;

FIG. 8 shows the lighting device of FIG. 7 in a sectioned view;

DETAILED DESCRIPTION OF THE PREFERRED EMBODIMENTS

The lighting device 1 according to the invention comprises an extended light source 2, a reflector 3 and a lens 4.

Figure 3:
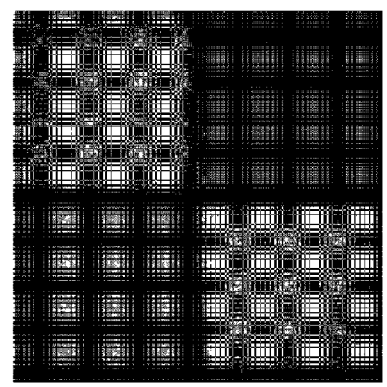
FIG. 3 shows the image generated to infinity on a screen by a cone of light rays of a conventional lighting device, wherein the same light source is used as for generating the image according to FIG. 1.
Figure 9:
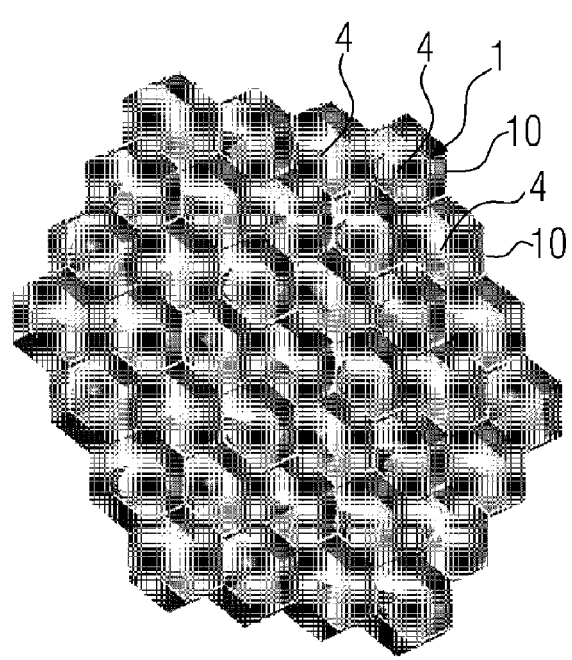
FIG. 9 shows an array of lighting devices in a perspective view.
Figure 10:
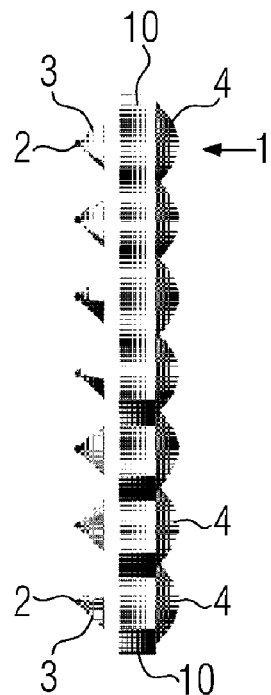
FIG. 10 shows the array of FIG. 9 in a side view.

An extended light source 2 is a non-punctiform light source which has structures. In the event of optical imaging, i.e. if the lens is mounted with the focal point close to the extended light source, such structures produce structures in the cone of light rays. In the case of lighting devices for the illumination of objects, for example torches or headlights, this is undesired, since the cone of light rays will then have areas with strongly varying light intensity distribution. In the present embodiment, the extended light source 2 is comprised of an array of four light-emitting diodes or light-emitting diode chips. Each light-emitting diode or each light-emitting diode chip forms an emitting surface, usually with a size of up to 1 millimeter (mm)×1 mm in each case. FIG. 3 shows the image, generated on a screen to infinity, of a conventional lighting device with such a light source comprised of four light-emitting diodes. Here the structure of the light-emitting diode array is clearly discernible. The images of the light-emitting diodes are numbered clockwise in FIG. 3 by I, II, III, IV, with light-emitting diodes I and III emitting green light, light-emitting diode II blue light and light-emitting diode IV red light. Between the individual light-emitting diodes in each case are narrow, strip-like dark areas which in a conventional lighting device cause corresponding dark structures in the far field.

An extended light source is usually formed by two, three or more light-emitting diodes. Extended light sources also include light sources other than light-emitting diodes, provided they have structured areas which, with optical imaging of the light source to infinity, lead to a cone of light with uneven light intensity distribution.

In the present embodiment, the extended light source 2 has four light-emitting diodes, each representing a planar Lambertian source. Such light-emitting diode arrays are offered for example by the company Cree Inc., USA under the trade name Cree® XLamp® MC-E LED. This light-emitting diode array has four light-emitting diodes, each of which is square in shape. Viewed from above, the light-emitting diodes are arranged within a square, with a cross-shaped gap between the individual light-emitting diodes. The light-emitting diodes may not be mounted edge to edge in the light-emitting diode array. A data sheet (Data Sheet CLC-DS16 Rev. 5 © 2008-2009) for these light-emitting diodes is obtainable from the website of Cree, Inc. This light-emitting diode array is provided with an integral auxiliary lens.

Another light-emitting diode array suitable for the lighting device according to the invention is sold by the company Seoul Semiconductor under the trade name W724CO. This light-emitting diode array also has four square light-emitting diodes arranged in a square, with a gap between individual light-emitting diodes. This results in a cross-shaped area, at which no light is emitted. This light-emitting diode array also has an auxiliary lens. A relevant data sheet (document no. SSC-QP-7-07-24/Rev. O3 May 2008) was published by Seoul Semiconductor.

The light source 2 is mounted with its emitting surface at right-angles to an optical axis 5 which runs through the centre of the light source.

The reflector 3 is in the form of a conical frustum, which encompasses the extended light source 2. In the present embodiment the reflector is a conical frustum of square cross-section (pyramidal frustum). The cross-sectional shape of the reflector is usually matched to the shape of the light source, preferably having any desired polygonal cross-sectional shape or the form of a circle. At the widened end of the reflector 3, this forms an aperture 6. At the tapered end of the reflector 3, the light source 2 is so mounted that the light is emitted towards the aperture 6 of the reflector. The direction of emission 7 therefore runs parallel to the optical axis 5, from the light source 2 towards the aperture 6. The reflector 3 is mounted concentrically to the optical axis 5.

The lens 4 is mounted in front of the reflector 3 in the direction of emission 7. It is arranged concentrically to the optical axis 5. The lens 4 is designed so as to be movable along the optical axis 5 within a predetermined range. By moving the lens 4, the aperture angle of a cone of light rays 8 emitted by the light source 2 and shaped by the reflector 3 is varied.

In the present embodiment, the range of movement in the direction of emission is limited in such a way that, at the leading edge of the range of movement in the direction of emission 7, the focal point (see f in FIG. 5) of the lens 4 coincides with the notional apex 9 of the reflector 3 or is at least in the vicinity of the notional apex. In this position of the lens 4 at its maximum distance from the extended light source 2 and the reflector 3 respectively, the cone of light rays 8 is concentrated to the maximum extent to produce a concentrated cone of light rays 8/1 (FIG. 5). This position of the lens 4 is therefore described as the concentrated position.

If on the other hand the lens 4 is in the position of being at the least distance from the extended light source 2 and the reflector 3 respectively (FIG. 6), then the cone of light rays 8/1 formed in advance by the reflector 3 is formed into a maximally widened cone of light rays 8/2. This position of the lens is therefore described below as the widened position.

The lighting device according to the invention is distinguished by the fact that the focal point of the lens 4 in the concentrated position (FIG. 5) in the direction of emission 7 is located either behind or at a notional apex 9 of the conical reflector 3. This notional apex 9 is created by an imaginary straight-line continuation of the reflector surface 3 of the reflector.

By this means it is ensured that, through the shifting of the lens within the predetermined range of movement, the focal point of the lens does not come into the vicinity of the light source 2, which would lead to the optical imaging by the lens of the light source with its extended structure. The focal point therefore always keeps a minimum distance from the light source 2, extending from the light source 2 to the notional apex 9. By this, considerable mixing of the light of the extended light source 2 emitted by the individual structured areas and individual light-emitting diodes respectively is already obtained.

In addition, the light is almost optimally concentrated by the arrangement of the focal point at or close to the notional apex 9 of the reflector 3.

The étendue (geometrical flux) is a conserved quantity of optical systems. It is used to describe the geometrical capability of an optical system to allow the passage of light. The numerical value of the étendue is calculated as the product of the aperture size and the projected solid angle from which the system absorbs light. The value of the étendue (E) of a light source is calculated as follows:

$$E = n^2 \cdot A \cdot \pi \cdot \sin^2(\alpha),$$

Wherein n is the refractive index of the medium surrounding the light source, A is the luminous surface of the light source and a is the angle of emission of the light source, i.e. the half-angle of the emitted cone of light. For a light-emitting diode array with flat sealing with a surface of 4.41 mm², and an emission angle of 90°, the value of the étendue in air (directly after leaving the sealing material) comes to 13.85.

The value of the étendue for the cone of light rays of the optical system of the lighting device is calculated according to the following formula:

$$E = n^2 \cdot d^2 \pi / 4 \cdot \sin^2(\beta) \pi,$$

wherein d is the diameter of the lens, and β the half aperture angle of the generated cone of light rays.

This formula applies provided that the secondary lens completely covers the cone of light rays passing out from the reflector.

For a lens diameter d=34 mm and n=1, a minimum aperture angle of 4° follows for β. Greater concentration is possible only if less light is absorbed by the lens system. For the lighting device shown in FIGS. 5 and 6, a somewhat smaller aperture angle was realised in a position of the lens in which the lens covers only a part of the cone of light coming from the reflector. The cone of light of the light source (+/−90°) absorbed by the reflector corresponds to a numerical aperture of 1.

Figure 11:
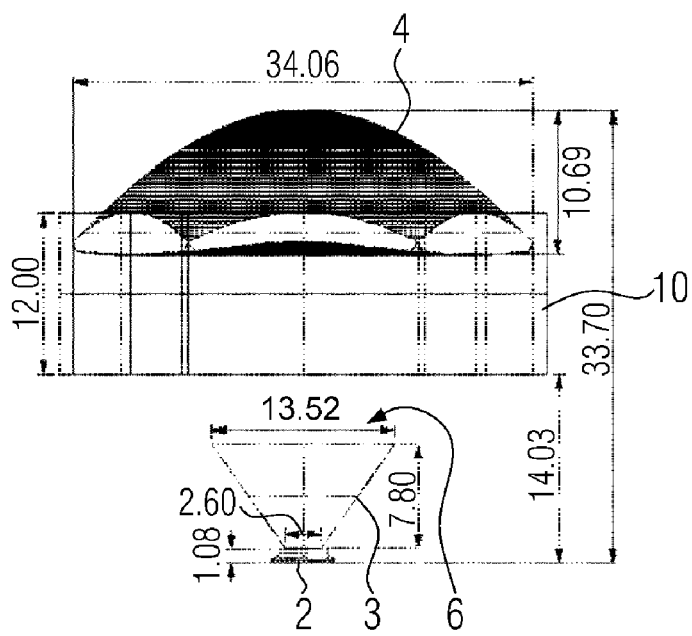
FIG. 11 shows a lighting device according to the invention in a side view with dimensions in mm.

The overall efficiency of the lighting device depends on the length of the reflector and the reflectivity of the reflector material. It is moreover dependent on how close the tapered end of the reflector can be located to the light-emitting diodes. Consequently, light-emitting diode arrays with flat sealing, i.e. with a smooth-surfaced transparent sealing, are more efficient than light-emitting diode arrays with a curved auxiliary lens. In the system realised, with a hexagonal lens, an overall efficiency of 55% at the light exit point was achieved, including Fresnel losses at the lens and reflector reflectivity of 92%. The dimensions of the lighting device are shown in mm in FIG. 11.

Figure 1:
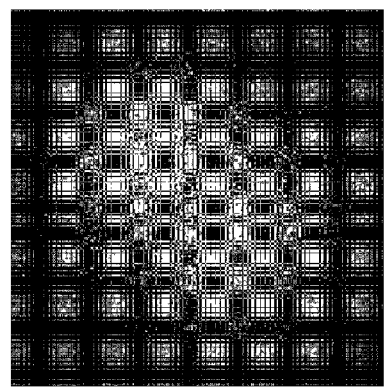
FIG. 1 is an the image, generated to infinity on a screen, of a cone of light rays of a lighting device according to the invention.

With this lighting device, therefore, a cone of light rays with high luminous flux is obtained, in which at the same time light from different structured areas and/or different light-emitting diodes is well mixed. FIG. 1 shows a cone of light rays generated to infinity on a screen by a lighting device according to the invention. In this, owing to the varying conversion of the colours into grey levels, the uniform and substantially rotation-symmetric illumination level distribution is hard to make out, since the light in the upper right-hand quadrants is mainly blue, in the lower left-hand quadrants mostly red, and in the two other quadrants mainly green, and the individual colours are converted with different strength into the grey level value.

The lens 4 of the lighting device is preferably multifocal or bifocal, with the focal length being smaller at least in a central area of the lens than outside this central area of the lens. Through this differing refraction of the light rays, further mixing of the light emanating from different structured areas of the light source is obtained. For a multifocal lens of this kind, the rule is that the focal point of the area of the lens with the largest surface in the direction of emission is preferably always located behind or at the notional apex 9 of the reflector.

Preferably the lighting device 1 according to the invention has a diaphragm 10. The diaphragm 10 is in the form of a tubular section, arranged coaxially to the optical axis 5 and surrounding the lens 4. The diaphragm 10 extends from the lens 4 at least a short distance away from the direction of emission 7. The diaphragm blocks off stray light from the cone of light rays, which would pass by the side of the lens 4.

Such a lighting device 1 with diaphragm 10 is suitable and especially advantageous in forming an array of lighting devices, since the individual lighting devices may be placed side by side without gaps and without the individual lighting devices being subject to interference from stray light from adjacent lighting devices. Preferably the peripheral shape of each lens 4 and diaphragm 10 is a regular hexagon. This permits the arrangement without gaps of a multiplicity of lighting devices, while the peripheral shape of a regular hexagon is substantially more similar to a circular shape than a square, so that the lenses 4—despite their polygonal shape— are suitable for creating a cone of light rays which is substantially circular in cross-section.

The individual lenses of the lighting devices combined to form an array of lighting devices are so physically interconnected that they may be moved together relative to the light sources. The light sources of the array are all arranged on one level. The optical axes of the lighting devices are parallel to one another. The lenses of the array of lighting devices are also arranged on one level. Preferably the individual lighting devices with their extended light sources are arranged rotated a short distance from one another when viewed from above so that, should any structure of the light source still be discernible in the cones of light rays of the individual lighting devices, these structures are evened out over the several cones of light rays of the lighting devices. Such a structure may occur for example in the use of light-emitting diodes which emit light of different colours, so that a cone of light rays with areas of differing colour is generated by a specific lighting device. Through the rotation of the individual lighting devices, an overall cone of light rays of uniform brightness and colour is obtained.

Figure 2A:
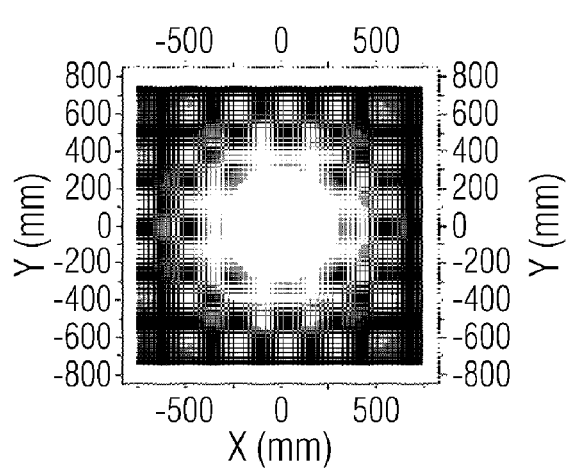
FIG. 2a shows the level of illumination of a cone of light rays produced by an array of lighting devices according to the invention, wherein the level of illumination is represented by corresponding grey levels.
Figure 2B:
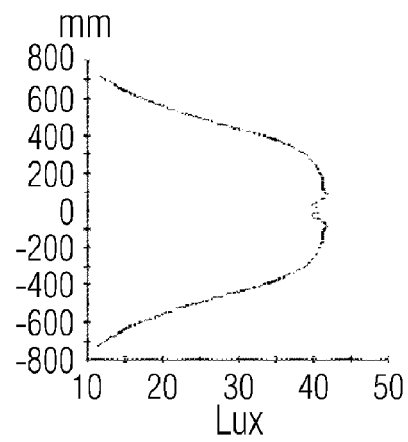
FIG. 2b shows the level of illumination of the cone of light rays of FIG. 1 along a section in a coordinate system.

FIGS. 2a and 2b show the illumination level distribution of such a cone of light rays in a cross-section area (FIG. 2a) and along a cross-section line (FIG. 2b). In FIGS. 2a and 4a the levels of illumination (lux) are given as grey levels, and in FIGS. 2b and 4b they are shown in a coordinate system, with the level of illumination plotted on the abscissa axis. The illumination level distribution of an array of lighting devices that can be achieved with embodiments of the invention is substantially rotation-symmetric (FIGS. 2a, 2b) with no darkening in the centre, as is the case for an array of conventional lighting devices (FIGS. 4a and 4b). The lighting devices of both arrays have the same extended light sources, such as for example a light-emitting diode array.

In the above embodiment the range of movement of the lens 4 is limited in such a way that its focal point is always located behind the notional apex 9 or at the notional apex 9. Within the scope of the invention it is however in principle also possible to design the range of movement of the lens 4 so that the lens with its focal point may be moved away from the notional apex 9 towards the light source 2.

LIST OF REFERENCE NUMBERS

1 lighting device,
2 extended light source
3 reflector
4 lens
5 optical axis
6 aperture
7 direction of emission
8 cone of light rays
9 notional apex
10 diaphragm While this invention has been particularly shown and described with references to preferred embodiments thereof, it will be understood by those skilled in the art that various changes in form and details may be made therein without departing from the scope of the invention encompassed by the appended claims.

What is claimed is:

1. Lighting device comprising
an extended light source,
a reflector which encompasses the light source and is in the form of a conical frustum with a wide aperture at the widened end of the reflector and a narrow aperture at a tapered end area at which the light source is arranged with the light being emitted towards the wide aperture of the reflector, wherein surface lines of the reflector intersect at a notional apex,
a lens for concentrating the emitted light, wherein the lens is mounted so as to be capable of moving along an optical axis of the lighting device within a predetermined range of movement with a focal point of the lens in the direction of emission being capable of being shifted at least into an area behind the notional apex of the reflector.

2. Lighting device according to claim 1, wherein the extended light source has several light-emitting diode chips, which are covered by a flat seal.

3. Lighting device according to claim 1, wherein the range of movement of the lens in the direction of emission extends so far forward that the focal point of the lens is able to coincide with the notional apex of the reflector or be brought at least into the immediate vicinity of the notional apex.

4. Lighting device according to claim 3, wherein the extended light source has several emitting surfaces, wherein the individual emitting surfaces are designed to emit light of different wavelength bands.

5. Lighting device according to claim 4, wherein the extended light source has several light-emitting diode chips, which are covered by a flat seal.

6. Lighting device according to claim 5, wherein the light source is a light-emitting diode array and the reflector has a regular polygonal shape in cross-section.

7. Lighting device according to claim 6, wherein the size of the lens is such that, at the maximum distance of the lens from the reflector, it completely covers the cone of light rays issuing from the reflector.

8. Lighting device according to claim 7, wherein the lens is multifocal, wherein the focal length at least in a central area of the lens is less than outside this central area of the lens.

9. Lighting device according to claim 8, wherein the periphery of the lens has the shape of a regular hexagon.

10. Lighting device according to claim 9, wherein the lens is surrounded by a diaphragm, which is in the form of a tubular section coaxial to the optical axis.

11. Lighting device according to claim 10, wherein the range of movement of the lens in the direction of emission is limited in such a way that, at the front edge of the range of movement in the direction of emission, the focal point of the lens coincides with the extended light source.

12. Lighting device according to claim 11, wherein the range of movement of the lens in the direction of emission is limited in such a way that, at the front edge of the range of movement in the direction of emission, the focal point of the lens coincides with the notional apex of the reflector or is at least in the vicinity of the notional apex.

13. Lighting device according to claim 1, wherein the extended light source has several emitting surfaces, wherein the individual emitting surfaces are designed to emit light of different wavelength bands.

14. Lighting device according to claim 1, wherein the light source is a light-emitting diode array and the reflector has a regular polygonal shape in cross-section.

15. Lighting device according to claim 1, wherein the size of the lens is such that, at the maximum distance of the lens from the reflector, it completely covers the cone of light rays issuing from the reflector.

16. Lighting device according to claim 1, wherein the lens is multifocal, wherein the focal length at least in a central area of the lens is less than outside this central area of the lens.

17. Lighting device according to claim 1, wherein the periphery of the lens has the shape of a regular hexagon.

18. Lighting device according to claim 1, wherein the lens is surrounded by a diaphragm, which is in the form of a tubular section coaxial to the optical axis.

19. Lighting device according to claim 1, wherein the range of movement of the lens in the direction of emission is limited in such a way that, at the front edge of the range of movement in the direction of emission, the focal point of the lens coincides with the extended light source.

20. Lighting device according to claim 1, wherein the range of movement of the lens in the direction of emission is limited in such a way that, at the front edge of the range of movement in the direction of emission, the focal point of the lens coincides with the notional apex of the reflector or is at least in the vicinity of the notional apex.

21. Array of lighting devices, wherein the array has several lighting devices, each of the lighting devices comprising:
an extended light source,
a reflector which encompasses the light source and is in the form of a conical frustum with a wide aperture at the widened end of the reflector and a narrow aperture at a tapered end area at which the light source is arranged in such a way that the light is emitted towards the aperture of the reflector, wherein surface lines of the reflector intersect at a notional apex,
a lens for concentrating the emitted light, wherein the lens is mounted so as to be capable of moving along an optical axis of the lighting device within a predetermined range of movement in such a way that a focal point of the lens in the direction of emission is capable of being shifted at least into an area behind the notional apex of the reflector, and the lighting devices are arranged with their optical axes parallel to one another, wherein the light sources lie on a single plane.

22. Array of lighting devices, wherein the array has several lighting devices, each of the lighting devices comprising:
an extended light source,
a reflector which encompasses the light source and is in the form of a conical frustum with an aperture at the widened end of the reflector and a tapered end area at which the light source is arranged in such a way that the light is emitted towards the aperture of the reflector, wherein surface lines of the reflector intersect at a notional apex, and
a lens for concentrating the emitted light, wherein the lens is mounted so as to be capable of moving along an optical axis of the lighting device within a predetermined range of movement in such a way that a focal point of the lens in the direction of emission is capable of being shifted at least into an area behind the notional apex of the reflector, and the lighting devices are arranged with their optical axes parallel to one another, wherein the light sources lie on a single plane;
wherein the lenses of the individual lighting devices are physically interconnected in such a way that they move only together along the respective optical axes.

23. Array according to claim 22, wherein the lighting devices are mounted adjacent to one another without gaps.

24. Array according to claim 23, wherein the extended light sources, viewed from above, are each rotated a short distance from one another.

25. Array according to claim 21, wherein the lighting devices are mounted adjacent to one another without gaps.

26. Array according to claim 21, wherein the extended light sources, viewed from above, are each rotated a short distance from one another.

* * * * *